United States Patent
Enoch et al.

(10) Patent No.: US 8,103,168 B1
(45) Date of Patent: Jan. 24, 2012

(54) RF DISCRETE TIME OPTICAL FREQUENCY TRANSLATOR

(75) Inventors: Michael Enoch, Placitas, NM (US); Parmijit Samra, Fremont, CA (US); Anthony C. Kowalczyk, San Carlos, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 950 days.

(21) Appl. No.: 11/938,157

(22) Filed: Nov. 9, 2007

Related U.S. Application Data

(60) Provisional application No. 60/857,797, filed on Nov. 9, 2006.

(51) Int. Cl.
*H04B 10/00* (2006.01)
(52) U.S. Cl. ...................................................... 398/140
(58) Field of Classification Search .................. 398/115, 398/183, 185–189, 192, 193, 198
See application file for complete search history.

(56) References Cited

U.S. PATENT DOCUMENTS

| | | | | |
|---|---|---|---|---|
| 5,880,870 A | * | 3/1999 | Sieben et al. | 398/183 |
| 5,920,666 A | * | 7/1999 | Digonnet et al. | 385/16 |
| 7,639,902 B2 | * | 12/2009 | Paolella | 385/13 |
| 7,676,161 B2 | * | 3/2010 | Roberts et al. | 398/194 |
| 2004/0070832 A1 | * | 4/2004 | Griffin | 359/566 |
| 2006/0171722 A1 | * | 8/2006 | Toliver | 398/188 |

* cited by examiner

*Primary Examiner* — Shi K Li
(74) *Attorney, Agent, or Firm* — McDermott Will & Emery LLP

(57) ABSTRACT

A frequency translator, a method, and a machine readable medium for performing frequency signal translations are disclosed. The frequency translator includes a modulator for modulating an optical pulse train with an input RF signal to generate an output optical pulse train having the amplitude information of the input RF signal at a plurality of times corresponding to the optical pulse train. In addition, the frequency translator includes a modulator for modulating the output optical pulse train by a digital cosine function having a desired target frequency to generate a translated optical signal. The frequency translator further includes a photodetector configured to generate an electrical waveform with the translated optical signal having the amplitude information of the input RF signal centered at the desired target frequency.

14 Claims, 11 Drawing Sheets

RF DISCRETE TIME OPTICAL FREQUENCY TRANSLATOR

CROSS-REFERENCE TO RELATED APPLICATION

The present application for patent claims the benefit of priority under 35 U.S.C. §119 from U.S. Provisional Patent Application No. 60/857,797, entitled "RF DISCRETE TIME OPTICAL FREQUENCY TRANSLATOR," filed on Nov. 9, 2006, the disclosure of which is hereby incorporated by reference in its entirety for all purposes.

FIELD OF THE INVENTION

The present disclosure relates generally to signal processing, and more specifically to performing a frequency translation of an RF signal in an optical domain.

BACKGROUND OF THE INVENTION

In many wireless communication systems, it is desirable to capture received signal information in a digital format so that digital signal processing ("DSP") techniques can be applied to that signal. The digital format makes it possible to manipulate the signal and extract useful information in ways that cannot be achieved with analog signal processing devices and elements. Because RF signals are received in an analog domain, however, wireless communication systems often use Analog-to-Digital Converters ("ADC") to convert the received RF signal to digital information.

The performance of the ADC is characterized by both resolution (the number of bits used to quantize the RF signal) and sample rate (the speed at which the ADC makes measurements of the signal). Fundamental relationships between the sampling rate and the bandwidth of the signal being measured must be maintained in order for the data from the ADC to be correct and useful.

Unfortunately, ADC performance is insufficient for direct sampling techniques (e.g. Nyquist or Bandpass) at higher RF frequencies, as performance of high speed ADCs are limited to sampling rates below ~3 Giga-Samples Per Second, and resolutions of less than 8 bits (with resolution improving at the expense of sample rate and vice versa). Accordingly, frequency conversion of an RF signal may require a down converter, generally composed of one or more local oscillators and mixers (such as in a superheterodyne receiver) to perform frequency conversion. In complex signal environments (e.g. a range of signal modulation formats having bandwidths and power levels in adjacent and/or even overlapping spectrum locations), non-linear effects in the mixers create intermodulation products that limit system performance. In addition, the quality of the local oscillators also affect performance, with high quality components being expensive and often subject to environmental effects that can degrade performance. Also, if bandpass sampling is applied in a complex signal environment, aliasing effects from multiple signals can fall within the same sampled spectrum and degrade the sampled data, preventing the signal of interest from being correctly captured.

SUMMARY OF THE INVENTION

In accordance with one aspect of the disclosure a frequency translator is provided. The frequency translator includes a receiver configured to receive an input RF signal having a carrier frequency and amplitude information. The frequency translator further includes an optical pulse transmitter configured to generate an optical pulse train having a plurality of optical pulses. The frequency translator further includes a first modulator configured to modulate the optical pulse train with the input RF signal to generate an output optical pulse train having the amplitude information of the input RF signal at a plurality of times corresponding to the plurality of optical pulses of the optical pulse train. The frequency translator further includes a second modulator configured to modulate the output optical pulse train by a digital cosine function having a desired target frequency to generate a translated optical signal, and a photodetector configured to generate an electrical waveform with the translated optical signal having the amplitude information of the input RF signal centered at the desired target frequency.

In accordance with another aspect of the disclosure, a method for performing a frequency signal translation in an optical domain is provided. The method includes the steps of receiving an input RF signal having a carrier frequency and amplitude information. The method further includes the step of generating an optical pulse train having a plurality of optical pulses. The method further includes the step of modulating the optical pulse train with the input RF signal to generate an output optical pulse train having the amplitude information of the input RF signal at a plurality of times corresponding to the plurality of optical pulses of the optical pulse train. The method further includes the steps of modulating the output optical pulse train by a digital cosine function having a desired target frequency to generate a translated optical signal, and providing the translated optical signal to a photodetector to generate an electrical waveform having the amplitude information of the input RF signal centered at the desired target frequency.

In accordance with yet a further aspect of the disclosure, a machine-readable medium having instructions executable by a processor is provided. The instructions include code for receiving an input RF signal having a carrier frequency and amplitude information. The instructions further include code for generating an optical pulse train having a plurality of optical pulses. The instructions further include code for modulating the optical pulse train with the input RF signal to generate an output optical pulse train having the amplitude information of the input RF signal at a plurality of times corresponding to the plurality of optical pulses of the optical pulse train. The instructions further include code for modulating the output optical pulse train by a digital cosine function having a desired target frequency to generate a translated optical signal, and providing the translated optical signal to a photodetector to generate an electrical waveform having the amplitude information of the input RF signal centered at the desired target frequency.

It is understood that other embodiments of the subject technology will become readily apparent to those skilled in the art from the following detailed description, wherein various embodiments of the subject technology are shown and described by way of illustration. As will be realized, the subject technology is capable of other and different embodiments and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below in connection with the appended drawings is intended as a description of various configurations of the subject technology and is not intended to represent the only configurations in which the subject technology may be practiced. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Signals can be divided into several ranges or bands of varying frequencies. Radio frequency (RF) signals have frequencies around 3 Hz to 300 GHz. The RF signal spectrum includes signals having a Very Low Frequency (9 kHz-30 kHz), a Low Frequency (30 kHz-300 kHz), a Medium Frequency (300 kHz-3 MHz), a High Frequency (3 MHz-30 MHz), a Very High Frequency (30 MHz-300 MHz), an Ultra High Frequency (300 MHz-3 GHz), a Super High Frequency (3 GHz-30 GHz), and an Extremely High Frequency (30 GHz-300 GHz). Many types of wireless devices make use of radio frequency (RF) signals. Some of these devices include cordless and cellular telephones, radio and television broadcast stations, satellite communications systems, and two-way radio services.

Other wireless devices make use of infrared frequency (IF) signals, whose electromagnetic wavelengths are shorter than those of RF signals. Examples include most television set remote-control boxes, some cordless computer keyboards and mice, and a few wireless hi-fi stereo headsets. While the subject technology is described with reference to RF signals, it will become apparent that the subject technology can be practiced with other signals, such as IF signals, microwave signals, visible light signals, ultraviolet light signals, x-rays, and gamma rays. Those skilled in the art will appreciate that components within the subject technology can be replaced or modified to handle the various signals.

An RF signal has a wavelength that is inversely proportional to its frequency. Information on the RF signal is carried by systematically changing, or modulating, some property of the radiated waves, such as their amplitude or their frequency. When the radio waves pass an electrical conductor or similar type of device, the oscillating fields induce an alternating current in the conductor. This can be detected and transformed into other signals that carry information.

Figure 1:
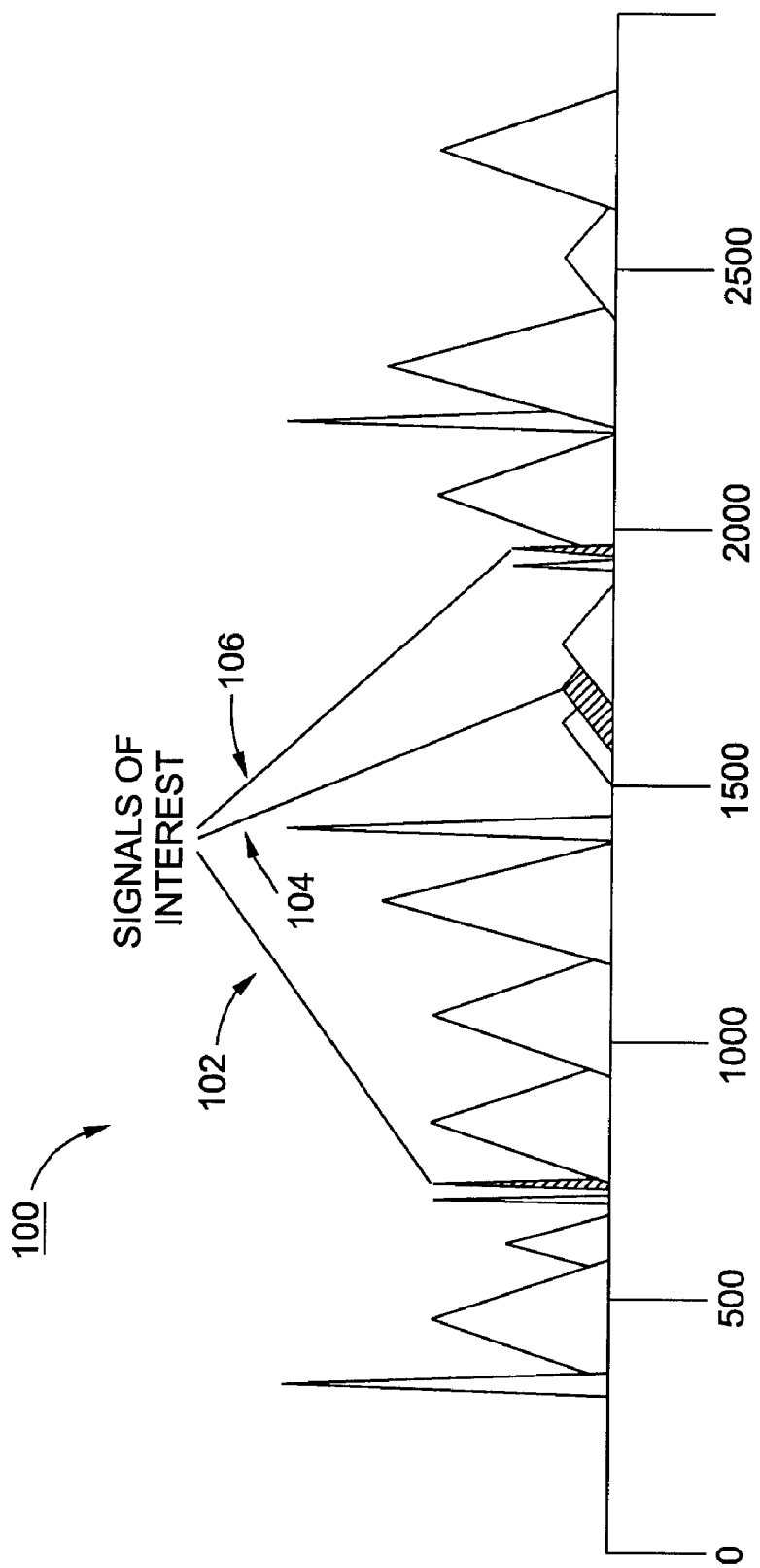
FIG. 1 is a chart illustrating exemplary RF signals that are detected by an electrical conductor in accordance with one aspect of the present disclosure.

FIG. 1 is a chart illustrating exemplary RF signals 100 that are detected by an electrical conductor or similar type of device in accordance with one aspect of the disclosure. As shown, the analog signals 100 are continuous signals with time varying features carrying information. In order to more effectively utilize the analog RF signals 100, an Analog-to-Digital Converter (ADC) is used to convert the analog signals 100 to discrete digital numbers so that digital signal processing (DSP) techniques can be used. DSP techniques include subfields like: audio and speech signal processing, sonar and radar signal processing, sensor array processing, spectral estimation, statistical signal processing, image processing, signal processing for communications, biomedical signal processing, etc.

To convert the analog signals 100 to discrete digital numbers, the ADC samples the analog signals 100. By sampling, the ADC measures and stores the signal values at intervals of time, which is known as the sampling time. The original signal can be reproduced from the discrete-time values by an interpolation formula. The accuracy of the reproduction, however, is limited by quantization error. Under the Nyquist sampling theorem, reproduction of the analog signal is only possible if the sampling rate is higher than twice the highest frequency of the signal. For example, an ADC cannot reproduce an original signal when the digital sampling bandwidth of the ADC does not encompass a spectrum of interest of the signals 102, 104, and 106.

Figure 2:
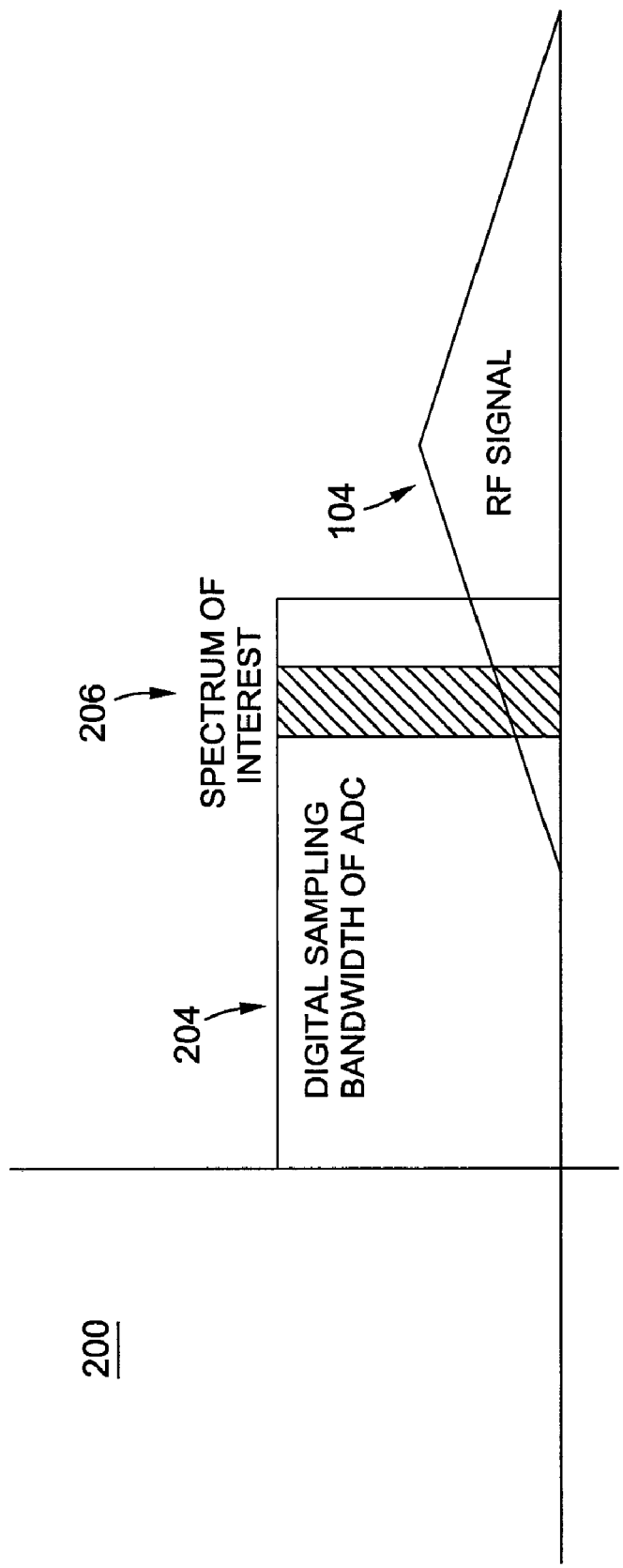
FIG. 2 is a chart illustrating an exemplary digital sampling bandwidth of an ADC encompassing a spectrum of interest of an RF signal in accordance with one aspect of the present disclosure.

FIG. 2 is a chart illustrating an exemplary digital sampling bandwidth of an ADC 204 encompassing a spectrum of interest 206 of RF signal 104 in accordance with one aspect of the disclosure. The digital sampling bandwidth of the ADC 204 is determined by using the Nyquist sampling theorem. When the ADC samples the analog signal 104 with a frequency below 500 MHz at a sampling rate of 1 Giga-Samples Per Second (GSPS), the spectrum of interest 206 falls within the bandwidth of the ADC 204. Accordingly, the ADC can directly capture the analog RF signal 104 and convert the signal 104 into digital information. The digital sampling bandwidth of ADCs frequently, however, is inadequate for many higher frequency spectrums of interest.

Figure 3:
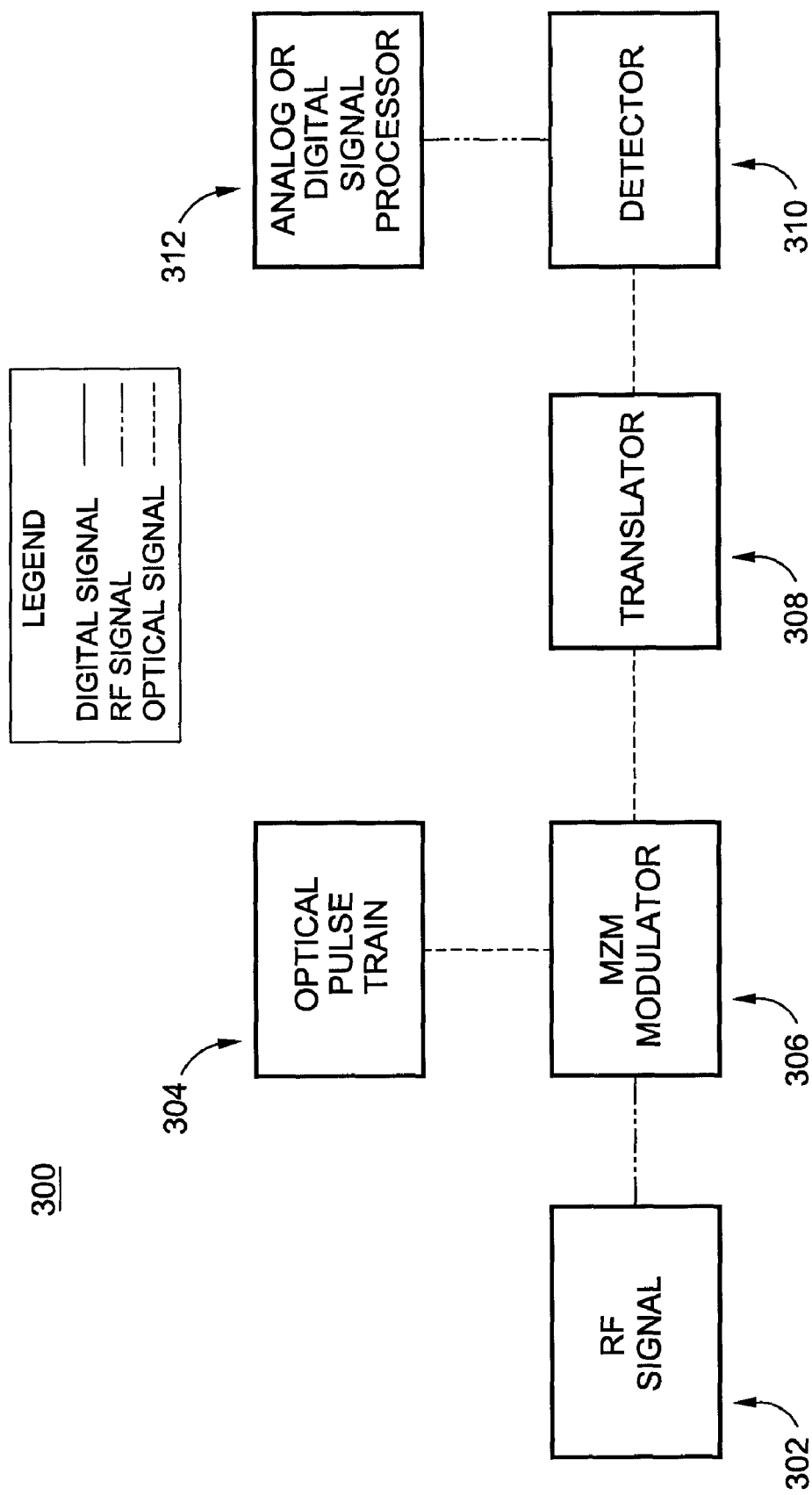
FIG. 3 is a conceptual block diagram illustrating an exemplary RF discrete time optical signal frequency translator in accordance with one aspect of the present disclosure.

In accordance with one embodiment, to overcome the inadequacies of such ADCs, an RF discrete time optical signal frequency translator (DTOS FT) is provided. FIG. 3 is a conceptual block diagram illustrating an exemplary RF DTOS FT 300 in accordance with one aspect of the present disclosure. The RF DTOS FT 300 performs a frequency translation of an RF signal in an optical domain. At block 302, the DTOS FT 300 receives an input RF signal having a carrier frequency and amplitude information. At block 304, the DTOS FT 300 generates an optical pulse train having a plurality of optical pulses. The DTOS FT 300 modulates the optical pulse train with the RF signal at block 306 to generate an output optical pulse train having the amplitude information of the RF signal at a plurality of times corresponding to the plurality of optical pulses of the optical pulse train. The DTOS FT 300 then modulates the output optical pulse train by a digital cosine function having a desired target frequency to generate a translated optical signal at block 308. The DTOS FT 300 then provides the translated optical signal to a photodetector to generate an electrical waveform having the amplitude information of the input RF signal centered at the desired target frequency at block 310. The DTOS FT 300 processes the electrical waveform by using either an analog processor or a digital processor at block 312.

Figure 4:
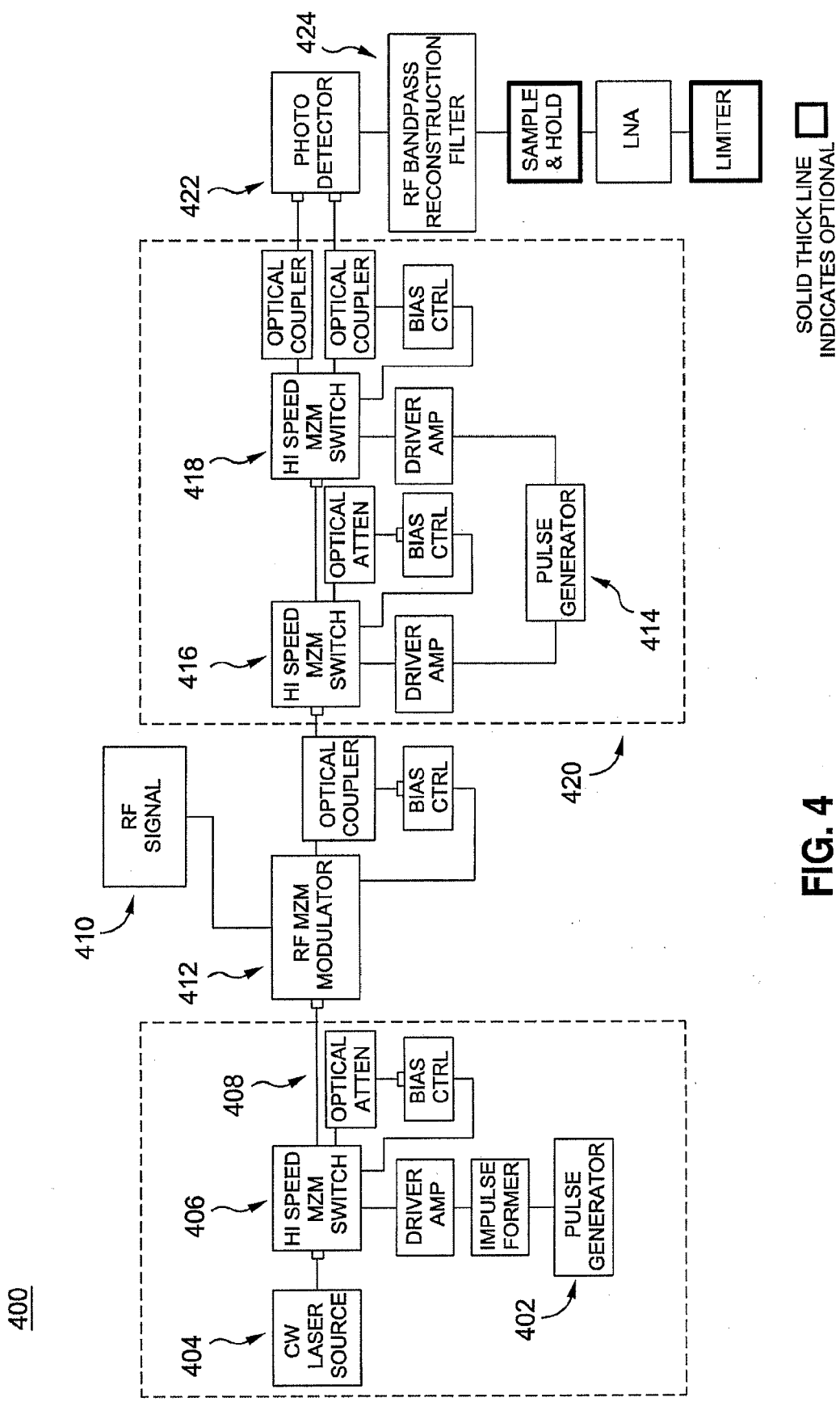
FIG. 4 is a schematic illustrating exemplary components of one embodiment of a RF discrete time optical frequency translator in accordance with one aspect of the present disclosure.

FIG. 4 is a schematic illustrating exemplary components of one implementation of a RF DTOS FT 400 in accordance with one aspect of the present disclosure. The components within the schematic perform a frequency translation of an RF signal in an optical domain. As shown in FIG. 4, the RF DTOS FT 400 removes the need for high performance mixers, oscillators, and image rejection filters, which can be expensive, may have significant mass and power needs, and also tend to be very sensitive to environmental factors, such as temperature, acoustics and shock, which can affect performance. The optical implementation has the additional advantages of lower complexity, better robustness, and greater device integration, permitting a system with reduced costs and fewer parts than other approaches.

The exemplary RF DTOS FT 400 includes a pulse generator 402, a laser source 404, a high speed Mach-Zehnder Modulator (MZM) switch 406, an optical pulse train 408, an RF signal receiver 410, an RF MZM modulator 412, a pulse generator 414, a set of high speed MZM switches 416 and 418, a frequency translator 420, a photodetector 422, and a RF bandpass reconstruction filter 424. Further components that can be in the RF DTOS FT 400 include driver amps, impulse formers, bias controls, optical antennas, optical couplers, splitters, sample and hold devices, low noise amplifiers, and limiters. One skilled in the art would appreciate that these components are not limiting, but rather represent exemplary components of one aspect of the disclosure.

With specific reference to the exemplary components of the RF DTOS FT 400, an input RF signal 410 having a carrier frequency and amplitude information is received by an RF MZM modulator 412. In addition, an optical pulse train 408 generated in an optical pulse transmitter is also received by modulator 412. The optical pulse train 408 contains a plurality of optical pulses at a pulse frequency. The pulse train 408 can be generated in a variety of manners that are insensitive, or at least less sensitive, to environmental factors which could affect analog circuitry. According to one aspect of the disclosure, the optical pulse train 408 can be generated by time gating a continuous wave laser source 404 with a high speed MZM switch 406 and a pulse generator 402. In effect, a clock circuit is used to drive the optical pulse generation process and to gate the operations of the optical switches. It is less difficult to create a precise clock than it is to create a precise local oscillator, since a clock signal is not detrimentally affected by higher order harmonics that may exist in the signal and that would result in harmonic distortion products if used as a local oscillator in a mixing process. In another aspect of the disclosure, the optical pulse train 408 may be generated by feeding a pulse generator 402 directly into a laser source 404. In various aspects of the disclosure, the optical pulse train 408 can be created either internally within or outside the RF DTOS FT 400. In accordance with another aspect of the present disclosure, the optical pulse frequency or repetition rate is selected to be four times the desired translation frequency at the output of the RF DTOS FT 400.

Continuing with FIG. 4, a modulator 412 is configured to modulate the optical pulse train 408 with the input RF signal 410 to generate an output optical pulse train having the amplitude information of the input RF signal 410 at a plurality of times corresponding to the plurality of optical pulses of the optical pulse train 408. In one embodiment, a wideband electro-optic modulator (EOM) can be used to capture discrete time samples of the input RF signal 410 in the optical domain. The RF signal 410 can be provided as input to the electrical signal input of the EOM 412 and the optical pulse train 408 can be provided as input to the optical input of the EOM 412. In one aspect of the disclosure, the EOM 412 may be a high speed MZM device.

Figure 5:
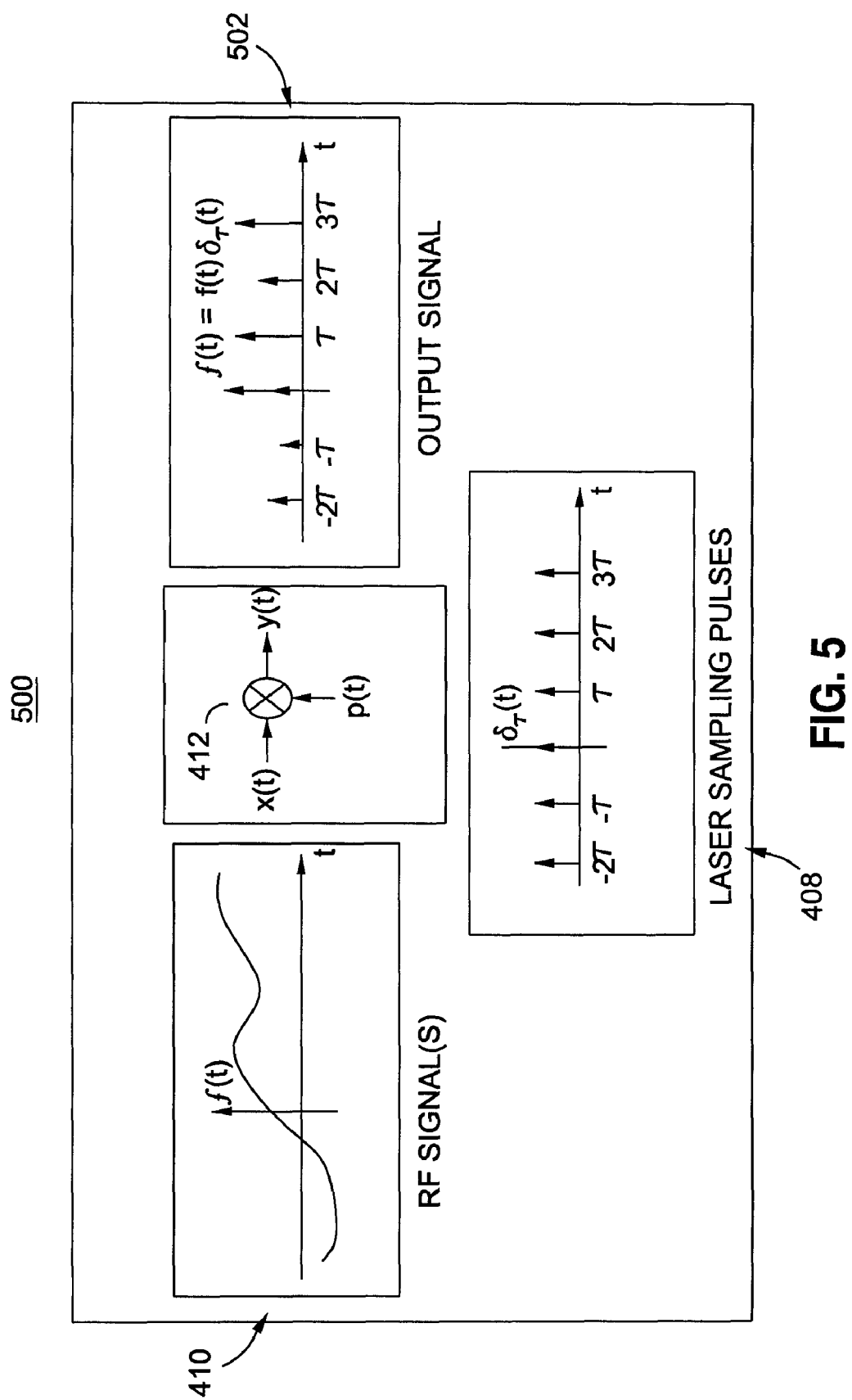
FIG. 5 is a diagram illustrating graphically an exemplary modulator for combining an RF signal with an optical pulse train to generate an optical output signal in accordance with one aspect of the present disclosure.

Turning to FIG. 5, a diagram illustrating graphically an exemplary modulator 412 for combining an input RF signal 410 with an optical pulse train 408 to generate an output optical pulse train 502 is provided in accordance with one aspect of the present disclosure. The input RF signal 410 can be represented as a continuous wave and the optical pulse train 408 can be represented as a series of discrete-time pulses. In the optical domain, the input RF signal 410 is chopped or sampled by the modulator 412 so that it exists as an output optical pulse train 502 with an amplitude of the pulses 408 equivalent to the time domain amplitude of the input RF signal 410. As can be seen with reference to FIG. 5, modulator 412 converts the negative amplitudes of the input RF signal 410 into positive amplitudes. By modulating the input RF signal 410 with the optical pulse train 408, samples can be taken at a faster rate than is possible with high performance mixers, oscillators, and image rejection filters. As will be shown below, oversampling allows for digital filtering and downsampling to a desired sampling frequency.

As shown in FIG. 5, six samples of the input RF signal 410 at six pulse times of the optical pulse train 408 are taken to produce the output optical pulse train 502. At discrete pulse time −2T, the output optical pulse train 502 has an amplitude corresponding to the absolute value of the amplitude of the input RF signal 410 at pulse time −2T. Although the amplitude is negative on the input RF signal 410, one skilled in the art will appreciate that an optical modulator 412 converts the negative amplitude into a positive amplitude. At discrete pulse time −T, the output optical pulse train 502 has an amplitude corresponding to the absolute value of the amplitude of the input RF signal 410 at time −T. At discrete pulse time 0, the output optical pulse train 502 has a positive amplitude corresponding to the absolute value of the amplitude of the input RF signal 410 at time 0. At discrete pulse time T, the output optical pulse train 502 has a positive amplitude corresponding to the absolute value of the amplitude of the input RF signal 410 at time T. At discrete pulse time 2T, the output optical pulse train 502 has a positive amplitude corresponding to the absolute value of the amplitude of the input RF signal 410 at time 2T. At discrete pulse time 3T, the output optical pulse train 502 has a positive amplitude corresponding to the absolute value of the amplitude of the input RF signal 410 at time 3T. Although only six samples are shown, numerous samples can be taken at a number of times dependent on the number of pulses from the optical pulse train 408.

Returning to FIG. 4, the output optical pulse train 502 from the EOM 412 is frequency translated, or down converted, using a frequency translator 420 to produce a translated optical signal. In accordance with one aspect of the disclosure, the frequency translator 420 performs a translation by multiplying the output optical pulse train 502 by a cosine function 600 at a frequency equivalent to the desired translation frequency.

Figure 6:
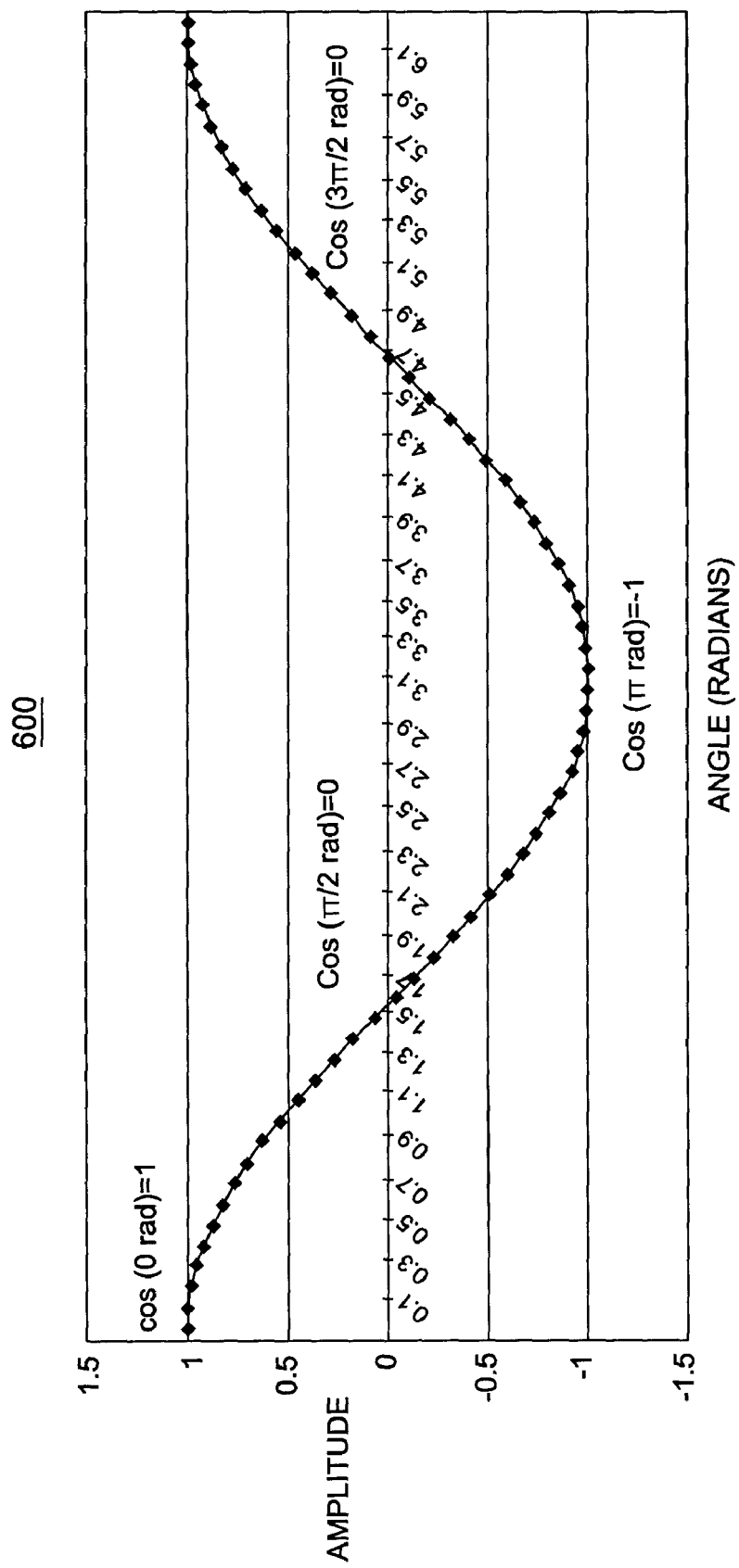
FIG. 6 is a diagram illustrating graphically an exemplary function having a desired target frequency to generate a translated optical output signal in accordance with one aspect of the present disclosure.

FIG. 6 is a diagram illustrating graphically an exemplary cosine function 600 having a desired target frequency to generate a translated optical signal in accordance with one aspect of the present disclosure. According to one aspect of the present disclosure, the cosine function 600 is a cosine wave sequence sampled at four times the desired frequency and can be represented as a repeating sequence of values equal to +1, 0, −1, and 0 when samples are taken at 0, 90, 180 and 270 degrees, respectively. Alternatively, the cosine function 600 is a sine wave sequence sampled at four times the desired frequency and can be represented as a repeating sequence of values equal to 0, +1, 0, and −1 when samples are taken at 0, 90, 180 and 270 degrees, respectively. By using a cosine function 600 that is a cosine wave sequence, or sine wave sequence, sampled at four times the desired frequency, the output optical pulse train 502, which represents oversampling of the RF signal, is downsampled to a desired target frequency.

Continuing with the previous illustration, a cosine wave sequence having values equal to +1, 0, −1, and 0 when samples are taken at 0, 90, 180 and 270 degrees is applied to the output optical pulse train 502 to generate the translated optical signal. When applied, the amplitude corresponding to discrete pulse time −2T of the output optical pulse train 502 is multiplied by +1 and results in a positive amplitude for the translated optical signal. The amplitude corresponding to discrete pulse time −T of the output optical pulse train 502 is multiplied by 0 and the translated optical signal does not record a value. The amplitude corresponding to discrete pulse time 0 of the output optical pulse train 502 is multiplied by −1 and results in a negative amplitude for the translated optical signal. The amplitude corresponding to discrete pulse time T of the output optical pulse train 502 is multiplied by 0 and the translated optical signal does not record a value. The amplitude corresponding to discrete pulse time 2T of the output optical pulse train 502 is multiplied by +1 and results in a positive amplitude for the translated optical signal. The amplitude corresponding to discrete pulse time 3T of the output optical pulse train 502 is multiplied by 0 and the translated optical signal does not record a value. Thus, the frequency of the output optical pulse train 502 can be translated by taking alternating samples and inverting every other remaining sample.

According to another embodiment of the present invention, a digital cosine function may also be represented by repeating the following series of values: $\sqrt{0.5}$, $-\sqrt{0.5}$, $-\sqrt{0.5}$ and $\sqrt{0.5}$, representing a cosine function sampled at 45, 135, 225 and 315 degrees, respectively. In such an embodiment, twice as many samples are utilized (i.e., every other sample is not zeroed out), and the overall power of the multiplexed signal is improved.

Returning to FIG. 4, the frequency translator 420 can be implemented using a pulse generator 414 and a series of high speed optical switches 416 and 418 according to one aspect of the present disclosure. Each high speed optical switch 416 and 418 can be a two output port electro-optic MZM switch. To perform the frequency translation 420, the output optical pulse train 502 is connected to a first MZM switch 416 that is connected to a pulse generator 414. By driving the switch 418 between the two phase extreme values so that the entire signal is routed into one port or the other, the first MZM switch 416 allows passage of alternating samples and renders the other samples as zero values.

The output of the first MZM switch 416 is then provided to the input of the second MZM switch 418. The second switch 418 that is also connected to the pulse generator 414 is operated so that the alternating samples from the first MZM switch 416 are switched between two output ports. Again, this is accomplished by driving the switch 418 between the two phase extreme values so that the entire signal is routed into one port or the other. Each output port of the two port MZM switch 418 can be 180 degrees of phase with respect to the other port, which is equivalent to multiplying the alternating samples of the first switch 416 with an alternating +1, −1 sequence. Thus, the second switch 418 inverts alternating samples from the first MZM switch 416 to generate the translated optical signal. In another aspect of the disclosure, the pulse generator 402 used to generate the optical pulse train 408 can be the same as pulse generator 414 used to frequency translate the output optical pulse train 502. The translated optical signal is provided to a photodetector 422 that generates an electrical waveform from the translated optical signal having the amplitude information of the input RF signal centered at the desired target frequency. The output of photodetector 422 is integrated with a low-pass or band-pass filter 424 sufficient to pass the frequency translated information bandwidth of the signal(s) of interest. The frequency translated or reconstructed signal can then be applied to an appropriate analog or digital signal processor for additional processing. The digital signal processor can convert the generated electric waveform into a digital waveform by using an ADC.

Figure 7:
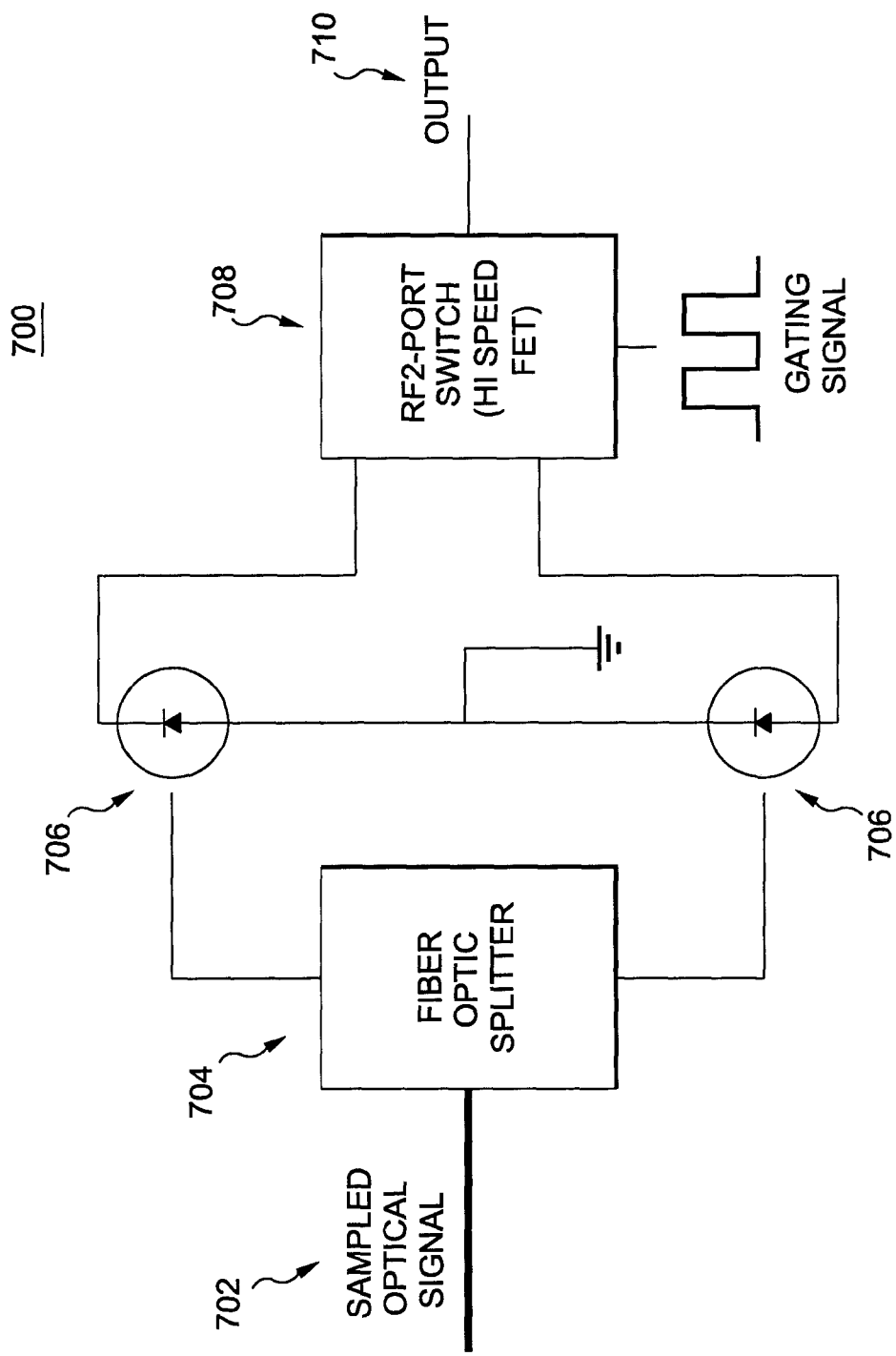
FIG. 7 is a conceptual block diagram illustrating an exemplary photodetector in accordance with one aspect of the present disclosure.

According to another embodiment of the present invention, the modulation of the sampled signal with a digital cosine function can be accomplished in a photodetector, instead of in a high speed MZM switch. A block diagram of one such exemplary photodetector is illustrated in FIG. 7 in accordance with one aspect of the present disclosure. The photodetector 700 includes a fiber optic splitter 704 for receiving the translated optical signal 702. The fiber optic splitter 704 divides light from a single fiber into two or more fiber channels. Attached to the two or more fiber channels are a pair of photodetectors 706. The pair of photodetectors 706 can be arranged in a balanced configuration. Connected to the pair of photodetectors 706 is a port switch 708 used for gating the signal. By alternately switching between the input signals (and inverting one of the input signals) the port switch effects a +1, −1 modulation, representing a digital cosine function, as explained in greater detail above. The components illustrated herein are merely exemplary components that can be used in implementing one photodetector. One skilled in the art would appreciate that these components are not limiting, but rather represent exemplary components of one aspect of the disclosure.

In another aspect of the disclosure, the optical pulse train from the optical pulse transmitter need not be monochromatic. The optical pulse train can include multiple optical carrier signals on a single optical fiber by using different wavelengths, or colours, of laser light to carry different signals. Each optical colour can have a different optical sample pulse repetition frequency. The advantages of such a system is that multiple RF signals can be processed simultaneously. The multiple RF signals can also be at higher carrier frequencies and/or wider information bandwidths than other methods.

Figure 8A:
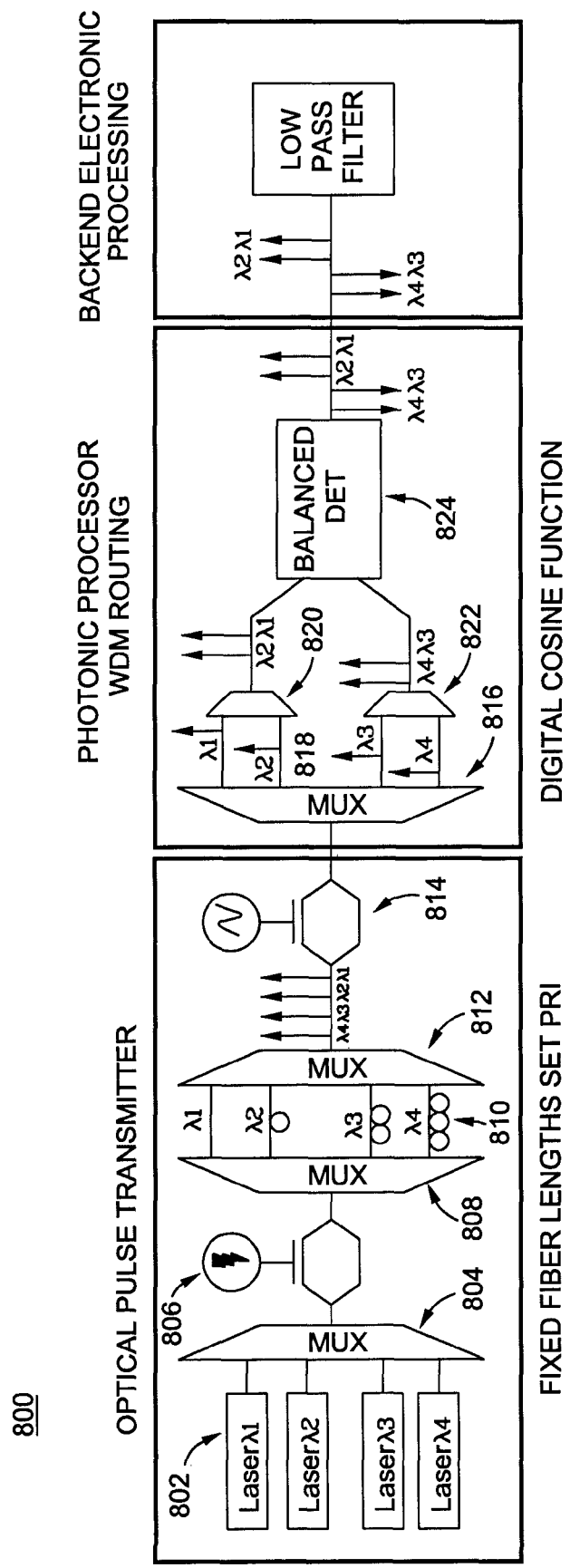
FIG. 8a is a conceptual block diagram illustrating an exemplary RF discrete time optical frequency translator with a wavelength division multiplexer architecture in accordance with one aspect of the present disclosure.

FIG. 8*a* is a conceptual block diagram illustrating an exemplary RF DTOS FT with a wavelength division multiplexer architecture 800 in accordance with one aspect of the present disclosure. The RF DTOS FT 800 can create an optical pulse train having multiple optical carrier signals on a single fiber using different wavelengths, or colours, of laser light to carry different signals with each optical colour having a different optical sample pulse repetition frequency. To create the optical pulse train, the wavelength division multiplexer architecture can contain a number of continuous wave lasers 802 such as Laser λ1, Laser λ2, Laser λ3, and Laser λ4 with each laser having a different wavelength. The laser pulses are then multiplexed onto a single optical fiber using an arrayed waveguide grating (AWG) multiplexer 804. In accordance with one aspect of the present disclosure, the optical pulse frequency or repetition rate is selected to be four times the desired translation frequency at the output of the RF DTOS FT 800.

In turn, the output colours λ1, λ2, λ3, and λ4 are lead into a high speed MZM interformeter 806 that creates pulses which temporally overlap. A mux/demux pair connected with differing fiber lengths 808, 810, and 812 is then used to offset the multi-wavelength pulses temporally to achieve a given pulse repetition interval (PRI) that feeds into MZM 814. MZM 814 impresses RF information onto the optical pulse carriers λ1, λ2, λ3, and λ4 as discussed in greater detail with reference to FIGS. 3, 4, and 5.

Figure 8B:
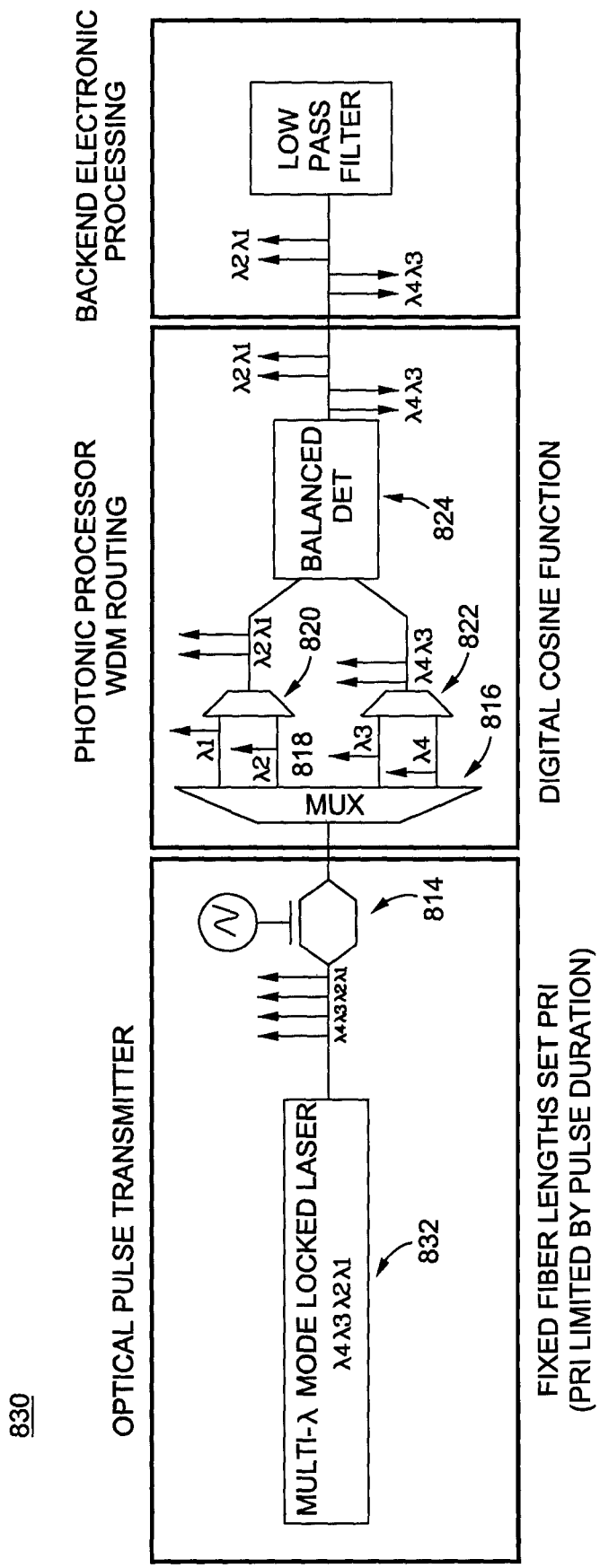
FIG. 8b is a conceptual block diagram illustrating an exemplary RF discrete time optical frequency translator with a multi-wavelength locked laser architecture in accordance with one aspect of the present disclosure.

In another aspect of the disclosure, other functionally equivalent methods of creating multi-wavelength optical pulses are available and could also be used. FIG. 8*b* is a conceptual block diagram illustrating an exemplary RF DTOS FT with a multi-wavelength locked laser architecture 830 in accordance with one aspect of the present disclosure. In this embodiment, the PRI is determined by the parameters of the laser 832 cavity. Repetition rates of 50 GHz are possible in commercially available lasers 832 with pulse durations of a few picoseconds. In this technique, a length of dispersive fiber is used to spatially and temporally separate colors emitted from the mode-locked laser 832. By precisely controlling the fiber length, various static PRIs can be created.

Continuing with both FIGS. 8*a* and 8*b*, an AWG demultiplexer 816 spatially separates output colours from MZM 814 into different output ports 818 corresponding to each wavelength λ1, λ2, λ3, and λ4 to perform a frequency translation of the output. When sampling of four colours or optical wavelengths is required, a single wavelength mux 820 would recombine λ1 and λ2 on to a single fiber and similarly a single wavelength mux 822 would recombine λ3 and λ4 on a single but different fiber in accordance with one embodiment. The resulting fibers are then fed into balanced detector 824.

The balanced detector 824 modulates the pulses with a digital cosine function (e.g., with repeating values of $\sqrt{0.5}$, $-\sqrt{0.5}$, $-\sqrt{0.5}$ and $\sqrt{0.5}$, as described in greater detail above, and generates an electrical waveform from wavelength λ1, λ2, λ3, and λ4. If the length of fibers between the MZM 812 and the balanced detector 824 are kept equal then balanced detector 824 will receive the translated optical signal and generate an electrical waveform by inverting equivalent electrical pulses of the translated optical signal at a PRI of the optical pulse train to perform the desired frequency translation.

It will be obvious to those skilled in the art that a Mach Zehnder based solution is considerably more complex to implement, as it requires bias control and associated electronics, specialized high-speed drive electronics, switch rise/fall times that limit PRI, extreme polarization integrity, and poor extinction ratio. It should also be noted that multiplexers 820 and 822 can be omitted for applications that utilize band pass sampling, as this would require only two wavelengths to create a digital cosine function (that feeds distinct balanced detectors 824). It should be noted that FIGS. 8*a* and 8*b* show an optical pulse transmitter with four optical wavelengths for ease of illustration. Those familiar with the art would recognize that AWGs are commercially available to support 40-channel 100 GHz telecom applications (and even 80 channels of 50 GHz operation). In the above architecture, a feature of the WDM approach is that multiple sets (of either two or four colors) can be processed in parallel to perform independent frequency translations without duplicating hardware (except of course for additional lasers and detectors). In the case of 40-channel 100 GHz operation, a DTOS-FT could perform up to twenty independent and unique frequency translations with a common set of hardware.

Figure 9:
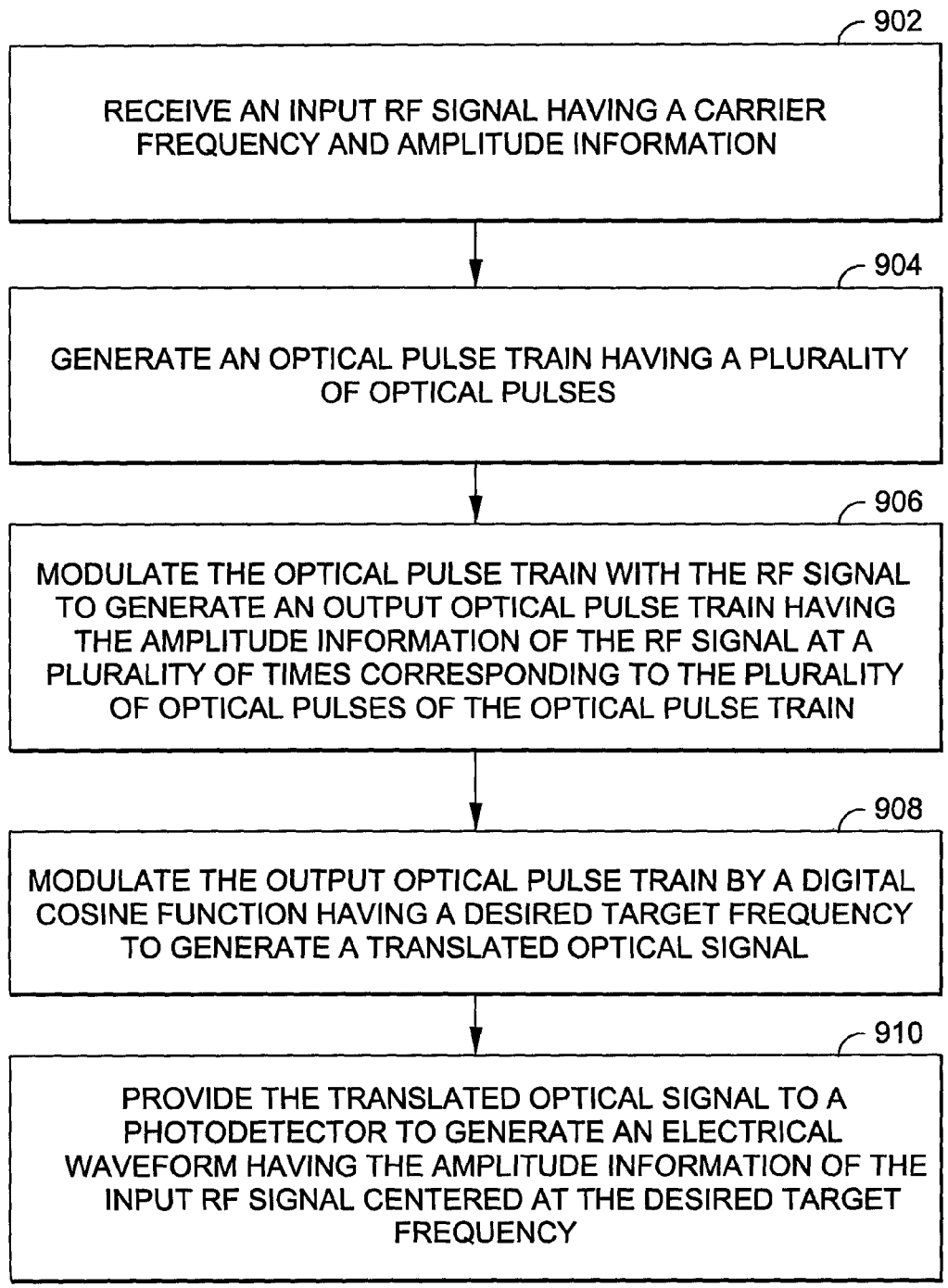
FIG. 9 is a flow chart illustrating an exemplary method of performing a frequency translation in an optical domain in accordance with one aspect of the present disclosure.

FIG. 9 is a flow chart illustrating an exemplary method of performing a frequency translation in an optical domain in accordance with one aspect of the present disclosure. In block 902, an input RF signal having a carrier frequency and amplitude information is received. In block 904, an optical pulse train having a plurality of optical pulses is generated. In block 906, the optical pulse train with the RF signal is modulated to generate an output optical pulse train having the amplitude information of the RF signal at a plurality of times corresponding to the plurality of optical pulses of the optical pulse train. In block 908, the output optical pulse train is modulated by a digital cosine function having a desired target frequency to generate a translated optical signal. In block 910, the translated optical signal is provided to a photodetector to generate an electrical waveform having the amplitude information of the input RF signal centered at the desired target frequency. A processor may perform the blocks 902, 904, 906, 908 and 910 according to one aspect of the disclosure.

Figure 10:
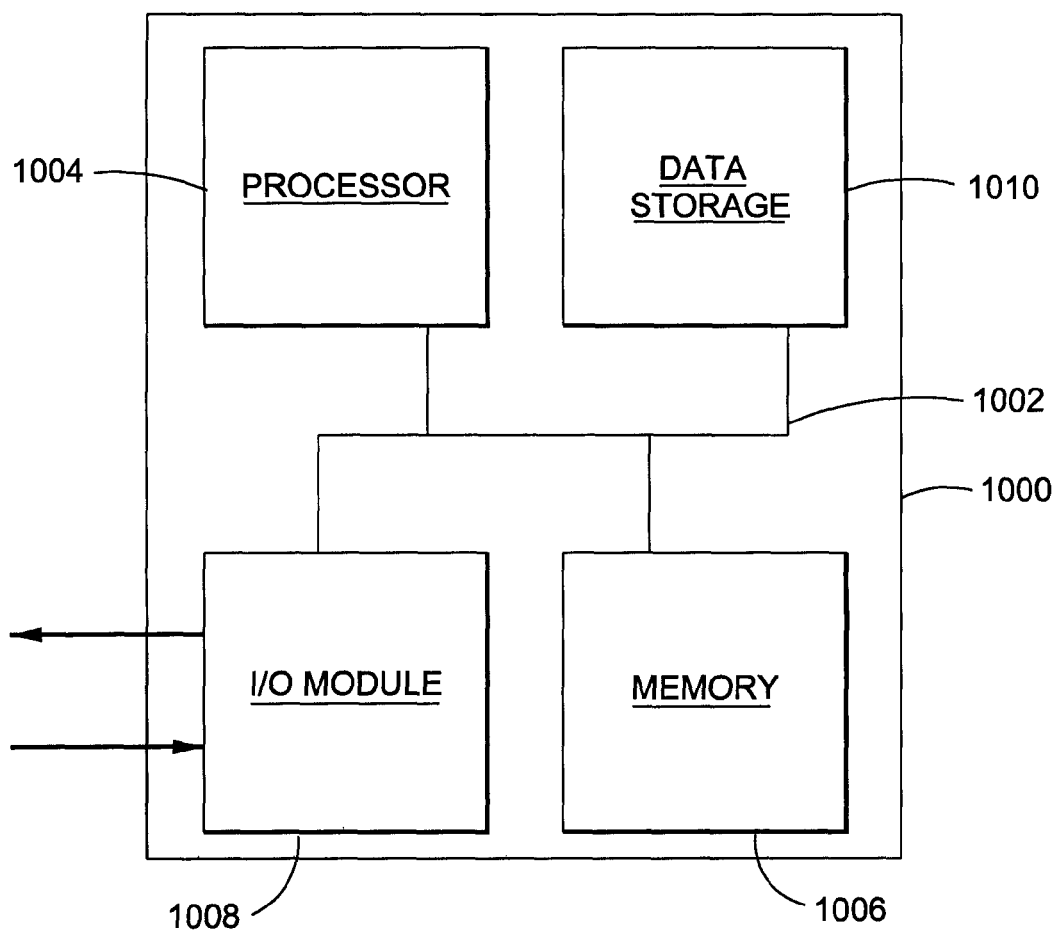
FIG. 10 is a block diagram that illustrates a computer system upon which an embodiment of the present disclosure may be implemented in accordance with one aspect of the present disclosure.

FIG. 10 is a block diagram that illustrates a computer system 1000 upon which an embodiment of the present disclosure may be implemented in accordance with one aspect of the present disclosure. Computer system 1000 includes a bus 1002 or other communication mechanism for communicating information, and a processor 1004 coupled with bus 1002 for processing information. Computer system 1000 also includes a memory 1006, such as a random access memory ("RAM") or other dynamic storage device, coupled to bus 1002 for storing information and instructions to be executed by processor 1004. Memory 1006 may also be used for storing temporary variable or other intermediate information during execution of instructions to be executed by processor 1004. Computer system 1000 further includes a data storage device 1010, such as a magnetic disk or optical disk, coupled to bus 1002 for storing information and instructions.

Computer system 1000 may be coupled via I/O module 1008 to a display device, such as a cathode ray tube ("CRT") or liquid crystal display ("LCD") for displaying information to a computer user. An input device, such as, for example, a keyboard or a mouse may also be coupled to computer system 1000 via I/O module 1008 for communicating information and command selections to processor 1004.

According to one embodiment of the present disclosure, the RF DTOS FT is implemented using a computer system 1000 in response to processor 1004 executing one or more sequences of one or more instructions contained in memory 1006. Such instructions may be read into memory 1006 from another machine-readable medium, such as data storage device 1010. Execution of the sequences of instructions contained in main memory 1006 causes processor 1004 to perform the process steps described herein. One or more processors in a multi-processing arrangement may also be employed to execute the sequences of instructions contained in memory 1006. In alternative embodiments, hard-wired circuitry may be used in place of or in combination with software instructions to implement various embodiments of the present disclosure. Thus, embodiments of the present disclosure are not limited to any specific combination of hardware circuitry and software.

The term "machine-readable medium" as used herein refers to any medium that participates in providing instructions to processor 1004 for execution. Such a medium may take many forms, including, but not limited to, non-volatile media and volatile media. Non-volatile media include, for example, optical or magnetic disks, such as data storage device 1010. Volatile media include dynamic memory, such as memory 1006. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative blocks, modules, elements, components, methods, and algorithms have been described above generally in terms of their functionality Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A frequency translator comprising:
   a receiver configured to receive an input RF signal having a carrier frequency and amplitude information;
   an optical pulse transmitter configured to generate an optical pulse train having a plurality of optical pulses, wherein the optical pulse transmitter includes a multi-wavelength locked laser, and wherein the optical pulse train comprises a plurality of optical carrier signals having an associated plurality of wavelengths, each optical carrier signal corresponding to a different optical sample pulse repetition frequency;
   a first modulator configured to modulate the optical pulse train with the input RF signal to generate an output optical pulse train having the amplitude information of the input RF signal at a plurality of times corresponding to the plurality of optical pulses of the optical pulse train;
   a second modulator configured to modulate the output optical pulse train by a digital cosine function having a desired target frequency to generate a translated optical signal, wherein the second modulator comprises a demultiplexer for spatially separating the output optical pulse train corresponding to the plurality of optical carrier signals with the associated plurality of wavelengths; and
   a photodetector configured to receive the translated optical signal and to generate an electrical waveform with the amplitude information of the input RF signal centered at the desired target frequency.

2. The frequency translator of claim 1, wherein the second modulator further comprises a plurality of multiplexers to recombine a subset of the subcomponents.

3. The frequency translator of claim 1, where the photodetector is a balanced photodetector configured to receive the spatially separated translated optical signal to generate the electrical waveform corresponding thereto, and to invert equivalent electrical pulses thereof.

4. The frequency translator of claim 1, wherein the optical pulse train is generated by time gating a continuous wave laser with a high speed switch.

5. The frequency translator of claim 4, wherein the high-speed switch is a Mach-Zehnder Modular switch.

6. The frequency translator of claim 1, wherein the first modulator is an electro-optic modulator.

7. The frequency translator of claim 1, further comprising an analog signal processor configured to sample the generated electrical waveform.

8. The frequency translator of claim 1, further comprising:
   an analog-to-digital convert configured to convert the generated electrical waveform into a digital waveform; and
   a digital signal processor configured to sample the digital waveform.

9. A method for performing a frequency signal translation in an optical domain, the method comprising the steps of:
   receiving an input RF signal having a carrier frequency and amplitude information;
   generating an optical pulse train having a plurality of optical pulses by interleaving plurality of optical carrier signals having an associated plurality of wavelengths, each optical carrier signal having a corresponding pulse frequency;
   modulating the optical pulse train with the input RF signal to generate an output optical pulse train having the amplitude information of the input RF signal at a plurality of times corresponding to the plurality of optical pulses of the optical pulse train;
   modulating the output optical pulse train by a digital cosine function having a desired target frequency to generate a translated optical signal by spatially separating the plurality of optical carrier signals with a demultiplexer; and providing the translated optical signal to a photodetector to generate an electrical waveform having the amplitude information of the input RF signal centered at the desired target frequency.

10. The method of claim 9, wherein the photodetector is a balanced photodetector configured to receive the spatially separated translated optical signal to generate the electrical waveform corresponding thereto, and to invert equivalent electrical pulses thereof.

11. The method of claim 9, wherein the step of modulating the output optical pulse train by the digital cosine function comprises:
   providing the output optical pulse train to a first switch that allows passage of alternating samples of the output optical pulse train; and
   providing the alternating samples of the first switch to a second switch that inverts every other alternating sample to generate the translated optical signal.

12. The method of claim 9, further comprising the step of sampling the generated electrical waveform with an analog signal processor.

13. The method of claim 9, further comprising the step of converting the generated electrical waveform into a digital waveform and sampling the digital waveform with a digital signal processor.

14. A non-transitory machine-readable medium comprising instructions executable by a processor, the instructions comprising code for:
   receiving an input RF signal having a carrier frequency and amplitude information;
   generating an optical pulse train having a plurality of optical pulses by interleaving a plurality of optical carrier signals having an associated plurality of wavelengths, each optical carrier signal having a corresponding pulse frequency;
   modulating the optical pulse train with the input RF signal to generate an output optical pulse train having the amplitude information of the input RF signal at a plurality of times corresponding to the plurality of optical pulses of the optical pulse train;
   modulating the output optical pulse train by a digital cosine function having a desired target frequency to generate a translated optical signal by spatially separating the plurality of optical carrier signals with a demultiplexer; and
   providing the translated optical signal to a photodetector to generate an electrical waveform having the amplitude information of the input RF signal centered at the desired target frequency.

\* \* \* \* \*